United States Patent [19]

Horie et al.

[11] Patent Number: 5,048,002
[45] Date of Patent: Sep. 10, 1991

[54] PHOTODISC APPARATUS WITH MEANS FOR CANCELING OFFSET OF TRACKING SERVO LOOP

[75] Inventors: Yuji Horie; Shoji Yoshikawa, both of Hachioji, Japan

[73] Assignee: Olympus Optical Co., Ltd., Tokyo, Japan

[21] Appl. No.: 515,009

[22] Filed: Apr. 26, 1990

[30] Foreign Application Priority Data

Apr. 27, 1989 [JP] Japan ................ 1-108033

[51] Int. Cl.[5] ............................................ G11B 7/095
[52] U.S. Cl. ............................... 369/44.35; 369/44.36
[58] Field of Search ............... 369/44.11, 44.34, 44.35, 369/44.36, 44.27, 44.28, 44.29; 360/78.04, 78.11

[56] References Cited

U.S. PATENT DOCUMENTS 4,707,648 11/1987 Minami ......................... 369/44.34
4,878,211 10/1989 Suzuki et al. ..................... 369/44.35

FOREIGN PATENT DOCUMENTS 63-106003 5/1988 Japan .

Primary Examiner—Roy N. Envall, Jr.
Assistant Examiner—Hindy Nabil
Attorney, Agent, or Firm—Armstrong, Nikaido, Marmelstein, Kubovcik & Murray

[57] ABSTRACT

A servo tracking system enables a beam spot formed on a photodisc through an objective lens to trace a track on the disc. After opening the tracking servo loop, a drive signal is supplied to a lens actuator so as to move the objective lens across the tracks thereby generating a tracking error signal. The tracking error signal is sampled for detection of the central value of the same. An offset control is conducted so as to make the central value of the tracking error signal fall within an allowable standard range.

16 Claims, 9 Drawing Sheets

PHOTODISC APPARATUS WITH MEANS FOR CANCELING OFFSET OF TRACKING SERVO LOOP

BACKGROUND OF THE INVENTION

1. Field of the Invention

The present invention relates to a photodisc apparatus having a tracking servo system for enabling a beam spot to trace an information recording track with a high degree of accuracy, with means for canceling offset of the tracking servo loop.

2. Description of the Related Art

In recent years, optical information recording/reproduction apparatuses have been put to practical use, in which information is densely recorded in a recording medium by means of a light beam spot focused on the recording medium or information is read or reproduced at high speed through sensing the light reflected from the medium by means of a photosensor.

In the recording/reproduction apparatus of the kind described, it is necessary that the light beam applied to the recording medium is held in focused state and in on-track state, in order to record information at a high density and to read information which has been recorded at a high density. To this end, the recording/reproduction apparatus is usually equipped with a focus control means and a radial tracking control means. These control means detects, as a focus error signal and a tracking error signal, information concerning amount of defocus of the beam and radial deviation of the beam contained in the light reflected back from the recording medium. The focus control means operates in response to the focus error signal and the tracking error signal so as to maintain the light beam in focused and on-track states.

In the apparatus of the kind described, it is often experienced that the positional relationship between the photodisc and the optical head is changed due to reasons such as a deflection of the photodisc or misalignment between the disc driving mechanism and the optical head, with the result that an offset is caused in the tracking signal.

Such an offset causes the tracking position to be deviated from the optimum position. For instance, the position of a reading light beam spot for reading information from a track is undesirably deviated from the center of the track, often causing a reading error.

Hitherto, therefore, it has been a common measure to adjust the optical position of the optical head through an observation of the tracking signal by for example, an oscilloscope. This method, however, is too time-consuming and impractical.

Japanese Patent Application Laid Open No. 63-106003 discloses a gain control means for a tracking servo loop but does not show any method or apparatus for correcting offset of the tracking signal.

SUMMARY OF THE INVENTION

An object of the present invention is to provide an optical recording/reproduction apparatus which enables any offset in the tracking servo system to be corrected with a high accuracy.

Another object of the present invention is to provide a gain control device which is simple in construction but yet capable of correcting any offset in the tracking servo system to be corrected highly accurately.

According to the invention, a drive signal is given to a lens actuator for driving an objective lens while the tracking servo loop is kept off such that the spot of the beam applied to a photodisc through the objective lens is moved across the tracks in the photodisc. As a result of the movement of the beam spot, tracking error signals are produced and the central levels of these tracking error signals are determined. Then, a variable level means, which is capable of shifting the level of the tracking error signal, is adjusted to vary the amount of the level shift such that the central level falls within a predetermined allowable standard range, whereby the offset is substantially canceled.

DESCRIPTION OF THE PREFERRED EMBODIMENTS

Figure 2:
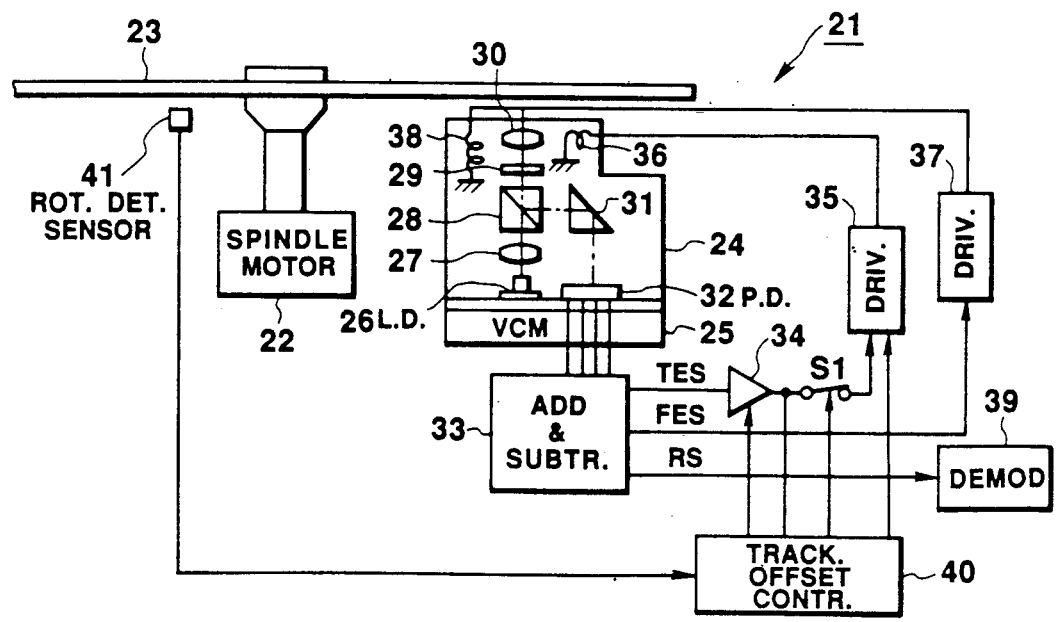
FIG. 2 is a block diagram of a first embodiment of an optical recording/reproducing apparatus of the present invention.

FIG. 2 shows a first embodiment of the optical recording/reproduction apparatus (referred to as "photodisc apparatus" hereinafter). The apparatus generally designated at 21 has spindle motor 22 for driving a disctype recording medium (referred to as "photodisc" hereinafter) 23. The apparatus 21 also has a photo-pickup 24 arranged to oppose a surface of the photodisc 23. The photo-pickup 24 is secured to a carriage which is moved by a pickup driving mechanism such as a voice coil motor (abbreviated as "VCM") 25 such that the pickup 24 moves in the radial direction of the photodisc 23. i.e., in the direction of an arrow T across concentric tracks or a spiral track in the surface of the photodisc 23.

The above-mentioned pickup 24 mounts a laser diode 26 as means for generating a light beam. The light beam generated by the laser diode 26 is collimated by a collimator lens 27 and is made incident to a polarized beam splitter 28 in, for example, P polarization, and is almost fully transmitted through the beam splitter 28. The transmitted light is circularly polarized through a quarter wave plate 29 and is focused through an objective lens 30 onto the photodisc 23. The light reflected by the photodisc 23 is condensed by the objective lens 30 and is S-polarized through the quarter wave plate 29 and reflected by the polarized beam splitter 28. The light reflected by the polarized beam splitter 28 is made to be incident to a critical angle prism 31 and the light from this prism 31 is received by a quadrant photodetector 32. The output from the photodetector 32 is input to an adding/subtracting circuit 33 having an adder and a subtracter whereby a tracking error signal TES, focus error signal FES and an RF reproduction signal RS are obtained.

The tracking error signal TES is delivered, through a variable offset amplifier 34, a switch Sl and a drive circuit 35, to a tracking coil 36 which serves as a lens actuator. The variable offset amplifier 34 is capable of correcting or canceling any offset of the tracking error signal, as the level of the signal input thereto is raised or lowered.

When the switch Sl is in an on state, i.e., when the tracking servo loop is closed, the objective lens 30 is held in a tracking condition for enabling the spot of the beam transmitted through this lens 30 to trace an object track in the photodisc 23.

A focusing error signal FES is supplied to a focusing coil 38 through the adder 33 and the drive circuit 37.

The RF reproduction signal RS is delivered to a demodulation circuit 39 for reproduction of the information.

The variable offset amplifier 34 is capable of changing the amount of the offset of the tracking error signal through the operation of a tracking offset control circuit 40.

The tracking offset control circuit 40 controls the state of the switch Sl. When the switch Sl is off, this circuit 40 delivers a drive signal for driving the objective lens 30 to the tracking coil 36 through the drive circuit 35. The tracking offset control circuit 40 also picks up the output signal from the variable offset amplifier 34 and detects the central value of the signal. The circuit 40 then controls the offset value of the variable offset amplifier 34 such that the detected central value falls within a predetermined allowable range.

Figure 1:
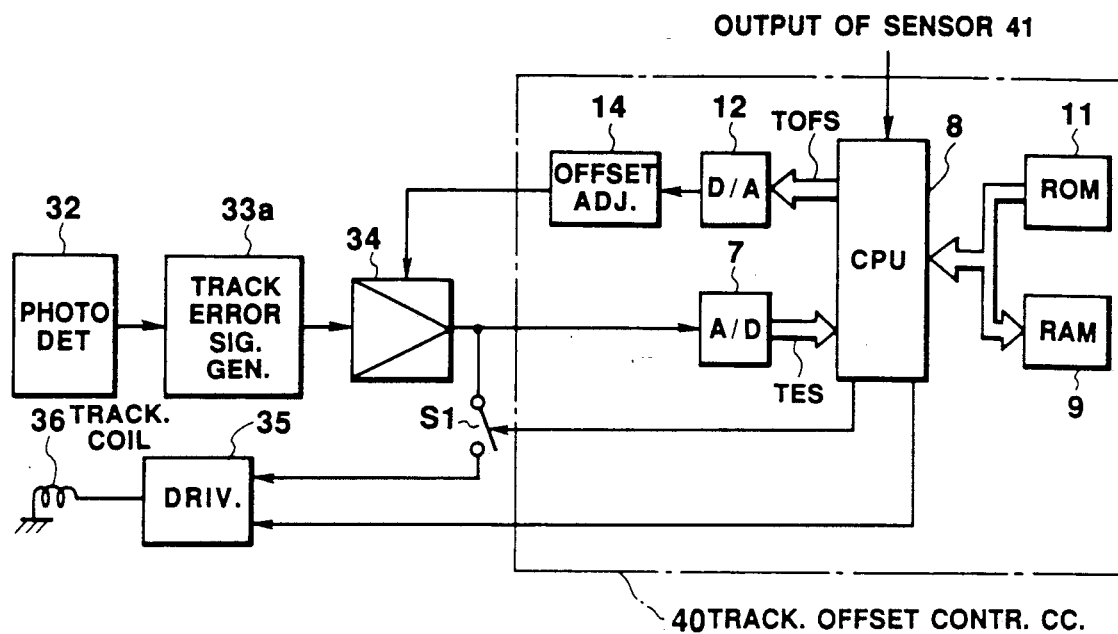
FIG. 1 is a block diagram of a tracking servo offset control circuit.

FIG. 1 shows the construction of the tracking offset control system including the tracking offset control circuit 40.

An output signal from the photodetector 32 is delivered to the adding/subtracting circuit 33. A track error signal generating circuit 33a in the circuit 33 forms a tracking error signal TES which is supplied to the tracking offset control circuit 40 through the variable offset amplifier 34. The tracking error signal TES is then made to pass through an A/D converter 7 in the tracking offset control circuit 40 so as to be changed into a digital signal and is then input to a CPU 8. The CPU 8 is connected through a BUS line to a RAM 9 which forms a work area and which is used as a memory for storing, for example, set values of the tracking error signals during the offset control, and also to a ROM 11 in which a predetermined standard value is written. When a tracking offset control is to be conducted, the CPU 8 operates to turn the switch Sl off and delivers a track cross signal to the drive circuit 35. In response to this track cross signal, a signal is delivered to the tracking coil 36 to cause the latter to drive the objective lens 30 across tracks. A tracking error signal TES obtained as a result of this operation is input to the CPU 8 through the A/D converter 7. The amplitude of the tracking error signal TES varies according to the gain set in the variable offset amplifier 34.

The CPU 8 delivers a offset tracking setting signal TOFS to the variable offset amplifier 34 through a D/A converter 12 and an offset controller 14. The level of the offset setting signal TOFS is varied such that the central value of the tracking error signal TES input through the A/D converter 7 falls within the allowable range stored in the ROM 11, whereby the tracking offset is controlled.

Figure 3:
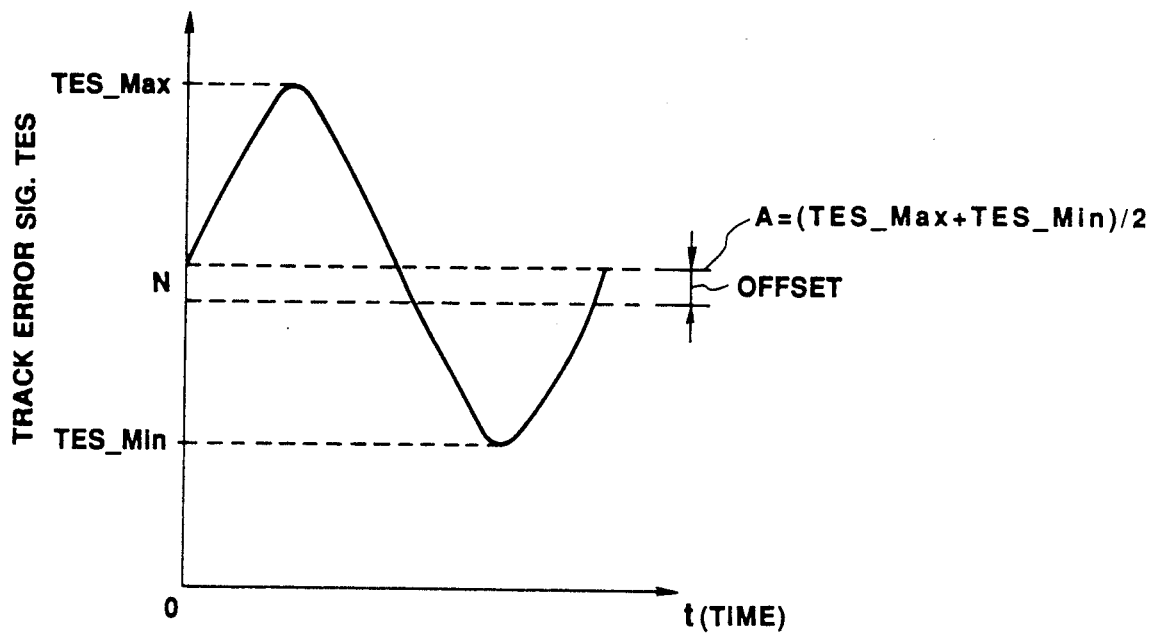
FIG. 3 is a waveform chart showing the waveform of tracking error signal obtained through a sampling.

As will be understood from the foregoing description, the control of the offset of the variable offset amplifier 34 is conducted with the tracking servo loop held in an open state. FIG. 3 shows the waveform of the track error signal TES which is formed when the beam spot has been moved across a track while the tracking servo loop is open. This waveform tends to be modulated by the track crossing speed of the beam spot which is determined by the amount of eccentricity of the photodisc 23. In order to effect a stable offset control through elimination of the influence of the eccentricity, the following measure is taken in the first embodiment under description. Namely, in this embodiment, when the tracking error signal is monitored, a track cross signal for enabling a track jump is delivered to the drive circuit 35 so as to move the objective lens 30 in a track jumping manner. The tracking error signal TES formed as a result of the track jump is sampled for a predetermined period by the A/D converter 7 and is then input to the CPU 8. The CPU 8 then reads the maximum and minimum values TES-Max and TES-Min of the track error signal TES. After completion of the sampling, the track cross signal which has been delivered to the drive circuit 35 is turned off and the central value A of the tracking error signal TES is computed from the amplitude of the tracking error signal TES. The CPU 8 then compares the central value A with a standard central value N which has been stored in the ROM 11. When the difference between the central value A and the standard central value N does not fall within the predetermined allowable range, the CPU 8 operates to vary the output of the D/A converter 12 in such a manner as to reduce the above-mentioned difference, whereby the offset of the variable offset amplifier 34 is controlled by the offset control section 14. The CPU 8 continues and repeats this operation until the difference between the central value A and the standard central value N comes to fall within the allowable range. In the arrangement shown in FIG. 2, the signal for driving the objective lens is controlled by the CPU 8. This, however, is not exclusive and the control may be conducted by other means than the CPU 8. When the tracking servo loop is in the closed state after the completion of offset control of the variable offset amplifier 34, the output from the variable offset amplifier 34 is supplied to the drive circuit 35 so that the objective lens 30 is driven in such a manner as to correctly trace the object track.

The variable offset amplifier 34 may be an operational amplifier which changes its offset in accordance with a change in the voltage level of a signal supplied to an offset control terminal thereof. In such a case, the offset control section 14 is made up from a voltage hold (sample hold) circuit capable of converting the level of the voltage delivered from the D/A converter 12 into an offset control voltage level and holding this offset control voltage.

Referring now to FIG. 2, a rotation sensor 41 for sensing rotation of the photodisc 23 is provided in the apparatus. The rotation sensor 41 includes, for example, a photo-reflector capable of detecting a photo-reflective portion which is provided at a portion of the photodisc 23 in the circumferential direction. The CPU 8 in the tracking offset control circuit 40 is capable of receiving the output from this sensor 41. The recording or reproducing operation is commenced when the rotation speed of the photodisc 23 sensed through the rotation sensor 41 has reached a predetermined speed.

The offset setting process performed by the CPU 8 will be explained with reference to flow charts shown in FIGS. 4a to 4c. It is assumed here that the disc rotates at 1800 rpm, and both the A/D converter 7 and the D/A converter 12 are of 8-bit capacity.

Figure 4A:
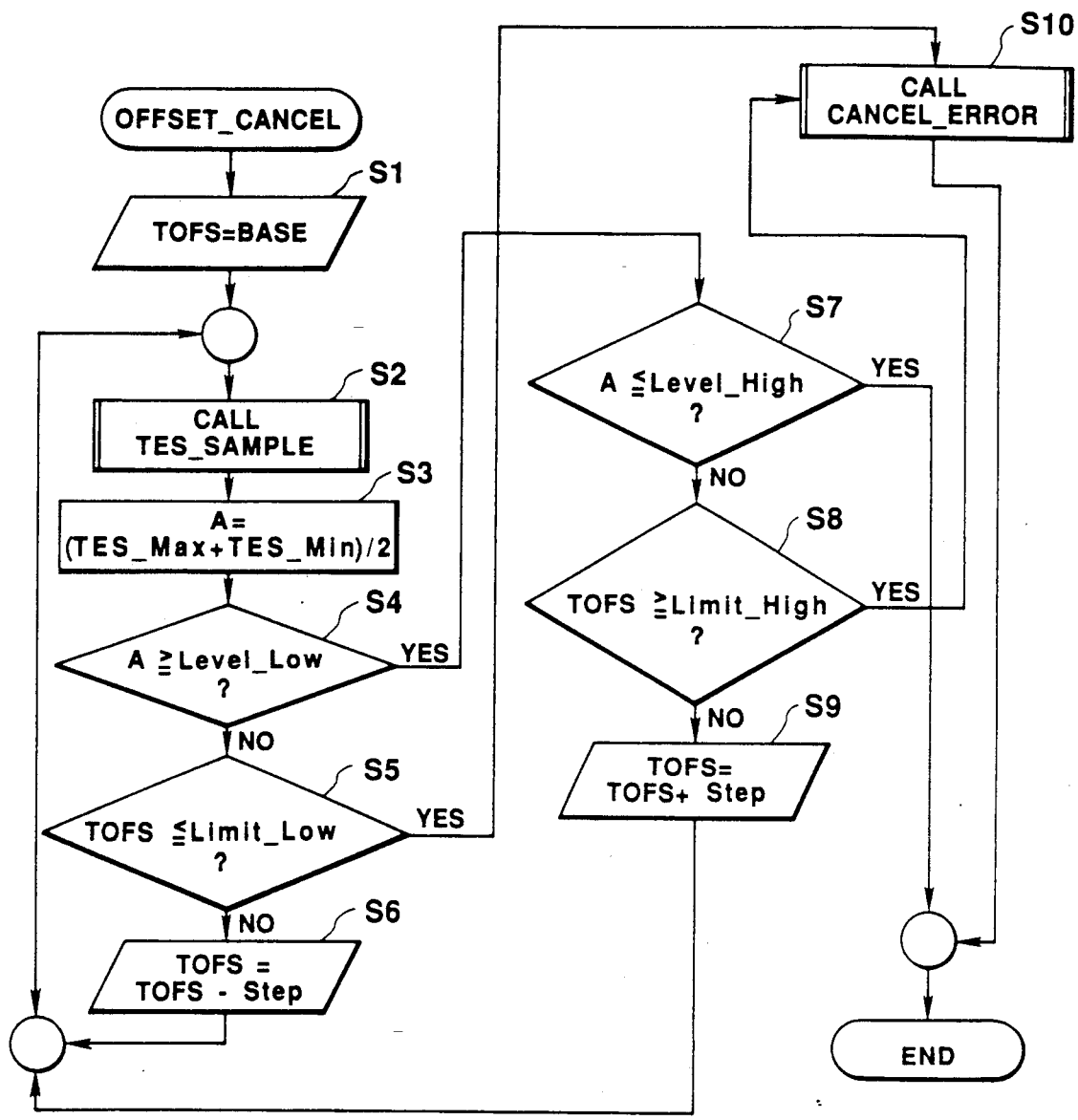
FIGS. 4a to 4c are flow charts showing an offset canceling process.
Figure 4B:
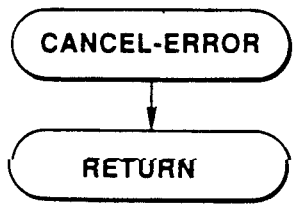
Figure 4C:
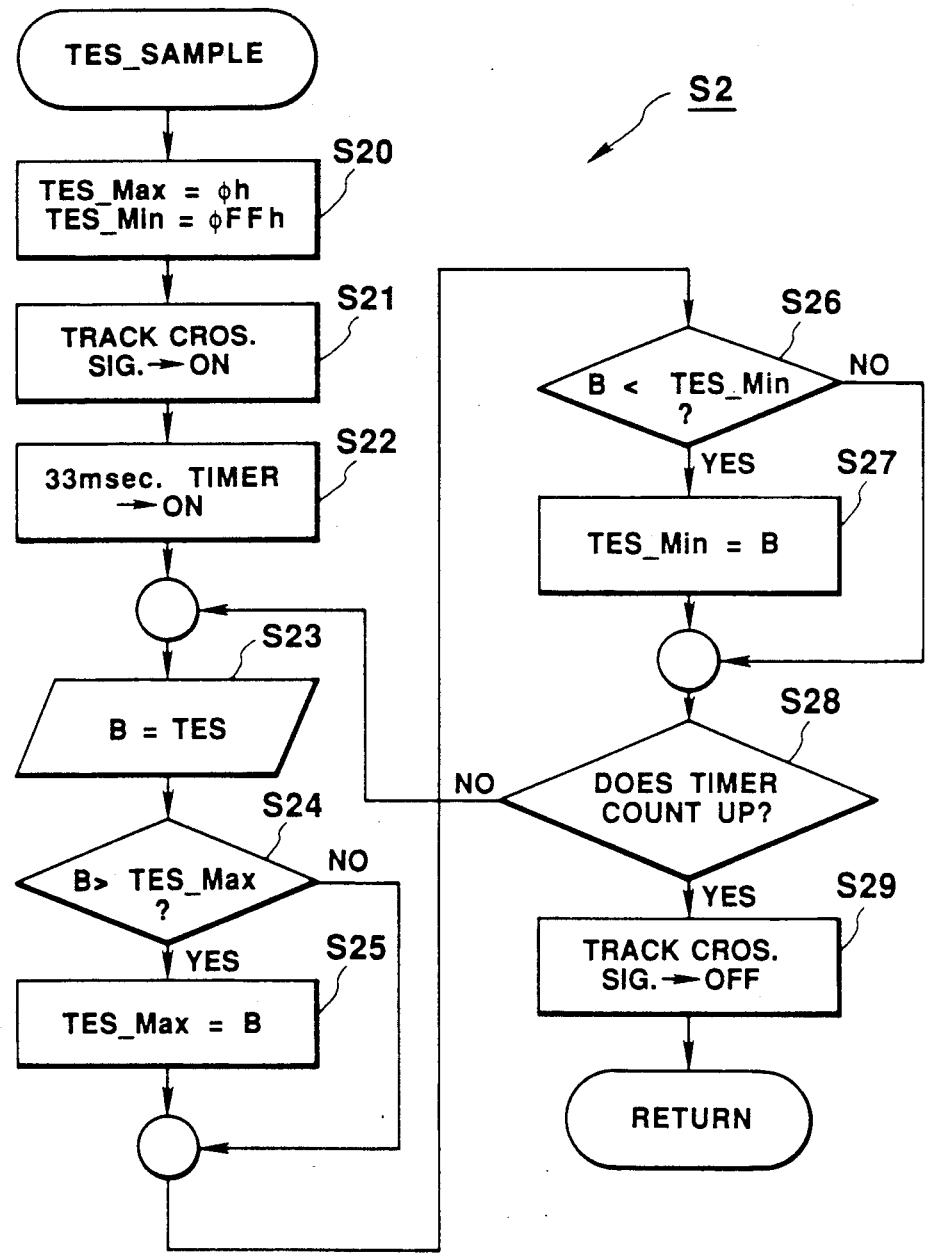

Referring to FIGS. 4a to 4c, in a step S 1, 128 (Base) which is ½ the range of variation is set as initial data in the D/A converter 12. Then, a sub-routine for executing the sampling of tracking error signal in Step S 2 is called. This sub-routine is shown in FIG. 4c Step S 20 conducts initial setting of the RAM 9. More specifically, the maximum value TES-MAX and the minimum value TES-MIN of the tracking error signal are set to 0 (hexa-decimal) and FF (hexa-decimal), respectively. The next step S 21 turns the track cross signal on. A timer for determining the sampling time is started in the nest step S 22. In this embodiment, the sampling is conducted throughout a period of one full rotation of the disc. In a step S 23, the track error signals from the A/D converter 7 are sampled. The level of the sampled tracking error signals TES is represented by B. In the next step S 24, whether this value B is greater than the maximum value TES-MAX of the tracking error signal TES is determined. If the answer is YES, the process proceeds to a step S 25 in which the maximum value TES-MAX is substituted with this value B, thus updating the content of the RAM 9. The process then proceeds to the next step S 26. Conversely, when the value B is not greater than the maximum value TES-MAX, the process proceeds directly to the step S 26 skipping over the step S 25.

The step S 26 determines whether the sampled value B is smaller than the minimum value TES-Min of the tracking error signal. If the answer is YES, the process proceeds to the next step S 27 in which the minimum value TES-Min is substituted by the value B, thus updating the content of the RAM 9. The process then proceeds to the next step S 28. Conversely, when the answer to the query posed in the step S 27 is NO, the process directly skips to the step S 28.

The step S 28 determines whether the sampling time is over. If not, the process returns to the step S 23. If the sampling time is over, the track cross signal is turned off in the next step S 29, whereby the sampling is finished. After completion of the sampling, the central value A is computed from the maximum and minimum values TES-Max and TES-Min in a step S 33.

In a step S 4, whether the central value A is not smaller than a predetermined lower limit value Level-Low stored in the ROM 11. If the answer is YES, the process proceeds to a step S 7 in which whether the central value A is not greater than a predetermined upper limit level Level-High. When the answer is YES, the CPU judges that the offset is permissible, and ceases the process.

However, if the step S 4 has proved that the value A is below the lower limit level Level-Low of the allowable range, the process proceeds to a step S 5 which determines whether the set value TOFS of the offset of the D/A converter 12 is not smaller than the upper limit value Limit-High, e.g., 255, of an allowable variation range. If the answer is NO, i.e., if the set value TOFS is below the upper limit value Limit-High (this is the case of the step S 1), the process proceeds to the next step S 6 in which the set value of the offset TOFS is incremented by one step, e.g., by one of several bits. The process then returns to a step S 2.

As the set value TOFS of the offset is incremented step by step, the central value A usually comes to exceed the lower limit value Level-Low of the allowable range, so that the process proceeds to the next step S 7. However, if, for example, optical alignment of the optical system is extremely bad, the set value TOFS of the offset may reach or exceed the upper limit value Limit-High of the allowable range before the central value A reaches the lower limit value Level-Low of the allowable range. In such a case, the process proceeds to a step S 10 which commences a control error sub-routine, so that the process is ceased without effecting any control as shown in FIG. 4b.

If the step S 7 has proved that the central value A is greater than the upper limit value Level-High of the allowable range, the process proceeds to a step S 8 in which whether the offset set value TOFS is not greater than the lower limit value Limit-Low of the allowable range. If the answer is NO, the offset set value TOFS is decreased one step and the process is returned to the step S 2. On the other hand, if the answer to the query posed in the step S 8 is YES as in the case of an extremely bad optical alignment of the optical system, the offset control error routine of the step S 10 is followed, thus terminating the control process.

Thus, in the offset control process conducted in this embodiment, the central level A of amplitude of the track error signal is detected under the condition where the offset TOFS is set at a level substantially midst the allowable range, and whether the value A falls within an allowable range is determined. The offset control process is ceased if this value A falls within the allowable range. Conversely, when this value A exceeds the upper limit value of the allowable range, the offset set value TOFS is decreased step by step, whereas, when the value A is below the lower limit, the offset set value TOFS is increased step by step. Consequently, the tracking offset is finally controlled to a value which makes the level of the tracking error signal fall within a predetermined range.

Figure 5B:
FIGS. 5a to 5c are flow charts of a process for a fine adjustment conducted after cancellation of offset.

A description will now be given of a fine offset control process performed by the CPU after the initial offset control, with specific reference to FIGS. 5a to 5c.

It is assumed here that the photodisc 23 has spiral tracks. In this case, in order to enable the objective lens to trace a specific track, it is necessary to effect a kickback of the objective lens per each rotation of the The process explained hereinunder with reference to FIGS. 5a to 5c is for effecting a fine offset control by sampling a track error signal which is produced when the objective lens is kicked back. The time required for the kick back is 1 msec.

In a step S 30, a track jump signal for effecting a kick back is turned on in response to, for example, an output from the sensor 41. In the next step S 31, a routine TES-CHECK is called. In this routine TES-CHECK, as shown in FIG. 7b, an initial setting of the RAM 9 is conducted in a step S 50, and a 1 msec timer is started in the next step S 51. Then, the tracking error signals TES are sampled in a step S 52. The next step S 53 determines whether the value B obtained through the sampling is greater than the maximum value TES-MAX of the track error signal stored in the RAM 9. If the answer is YES, the process proceeds to a next step S 54 in which the maximum value TES-Max is substituted with this value B, thus updating the content of the RAM 9. The process then proceeds to a step S 55. Conversely, when the answer is NO, the process directly proceeds to the step S 55 in which whether the value B is smaller than the minimum value TES-Min of the tracking error signal is determined. When the answer is YES, the value B is set as the new lower limit value TES-MIN, and the process then proceeds to a step S 57. When the answer is NO, the process directly proceeds to the step S 57. The step S 57 determines whether the sampling time is over. If the sampling time is not over, the process returns to the step S 2. However, if the sampling time is over, the process returns to the step S 31.

A step S 32 computes the central value A. Steps S 33 and S 36 are executed to determine whether the central value A falls within an allowable range determined by the lower limit value Level-Low and the upper limit value Level-High stored in the ROM 11. If the central value A falls within this range, the track jump signal is turned off in a step S 39 thus terminating the process. However, if the central value A falls out of the above-mentioned allowable range, steps S 34 and S 37 are executed to determine whether the set value of the D/A converter 12 is within an allowable range between, for example, Limit-Low=0 and Limit-High=255. If the set value falls within this range, steps S 35 and S 38 are executed to increment or decrement the set value of the D/A converter 12 by one or several bits, and the track jump signal is turned off to terminate the process in a step S 39. When the set value of the D/A converter falls out of the above-mentioned allowable range, the process proceeds to a step S 40 to execute an error routine.

Figure 5A:
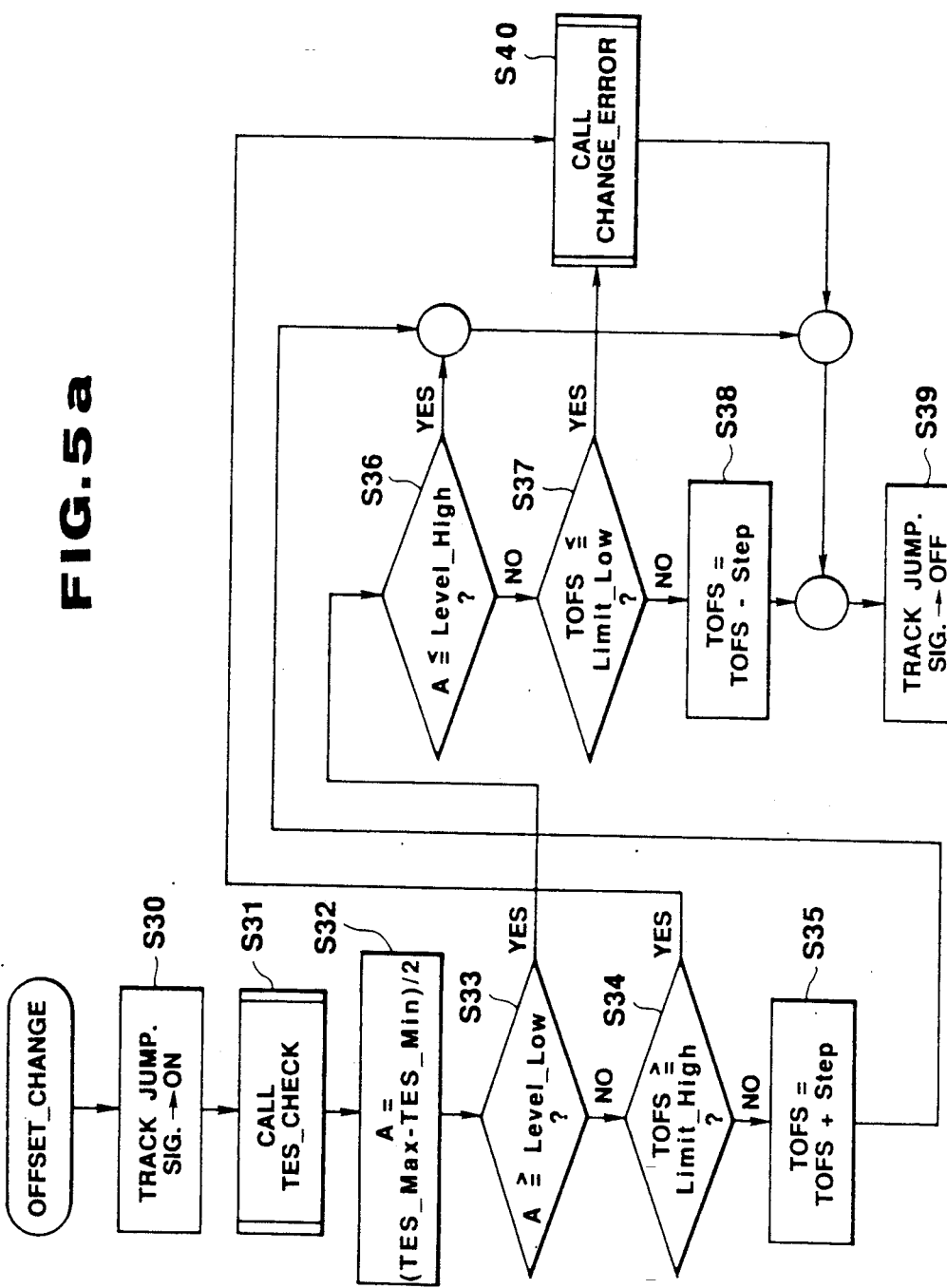
Figure 5C:
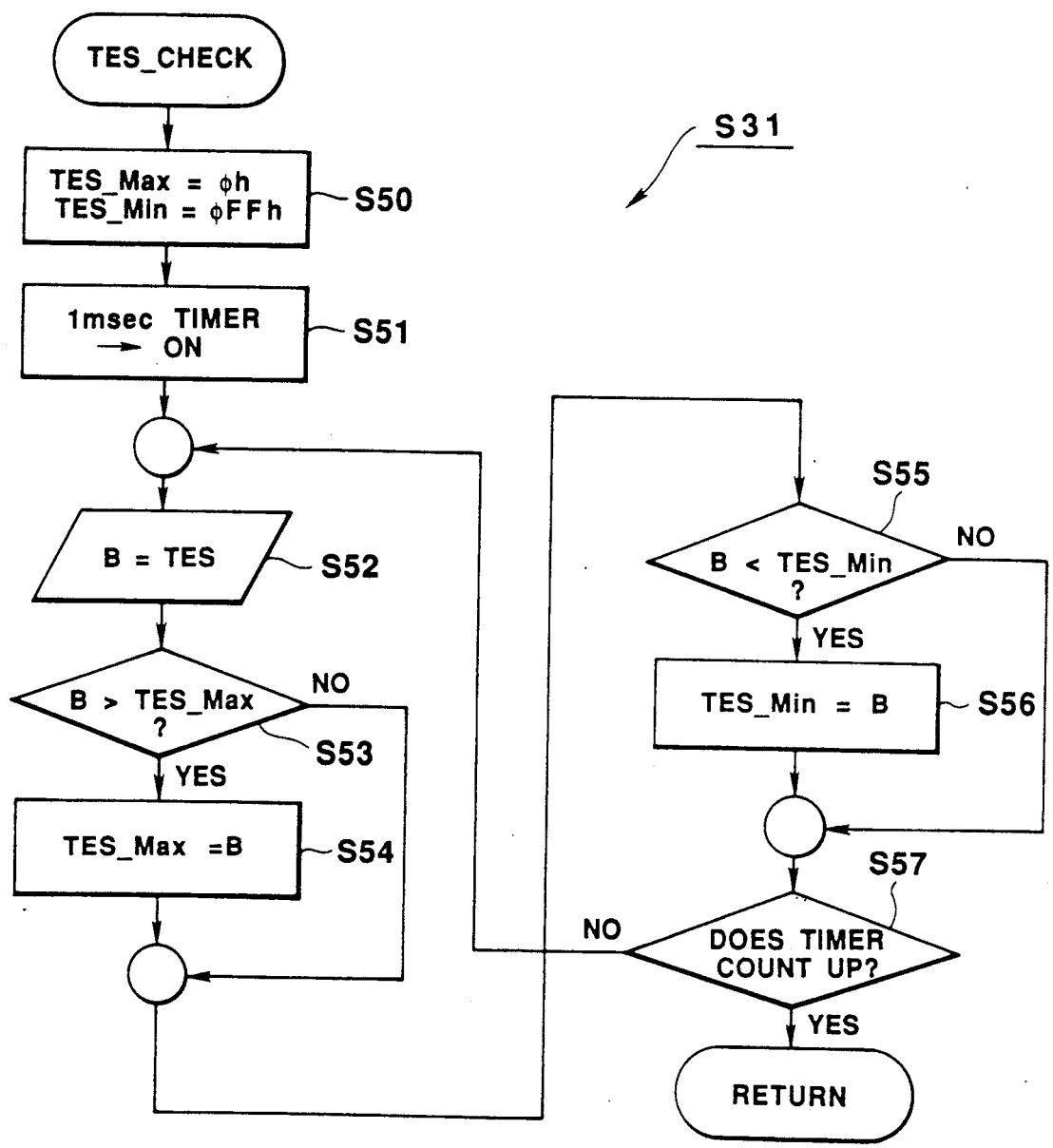

The contents of the steps S 32 to S 39 shown in FIG. 5a are the same as the steps S 2 to S 9 in the flow shown in FIG. 4a. The content of the step S 31 in the flow shown in FIG. 5c is different from the step S 2 in the flow of FIG. 4c only in that the step S 21 for turning the track cross signal on is eliminated and that a different time is set in the timer.

According to the first embodiment as described, the central value of the track error signal is detected by moving the beam spot at a speed high enough to cross a greater number of tracks than the number of tracks crossed due to the presence of an eccentricity, if any, in the photodisc 23. It is therefore possible to detect the central value with a higher level of accuracy and, hence, to attain a higher accuracy of the tracking offset control. In addition, since the beam spot is moved to cross the tracks at high speed, a greater number of tracking error signals are obtained in a short time, so that the track offset control can be completed in a shorter period of time. Furthermore, the tracking offset control is automatically performed with a simple arrangement.

The first embodiment as described enables the control of the tracking offset even when the rotation speed of the photodisc 23 is low. Therefore, the tracking offset control can be conducted in the course of start-up of the spindle monitor 22. The influence of the eccentricity is small when the rotation speed is low. It is possible to effect the tracking offset control without being substantially affected by the eccentricity when the rotation speed is low.

It is to be understood that the fine offset control described above is not essential and may be omitted if allowed by conditions.

In the first embodiment as described, the offset control is effected by applying to the offset control terminal of the variable offset amplifier 34 a voltage of a polarity for canceling the detected offset.

Figure 6:
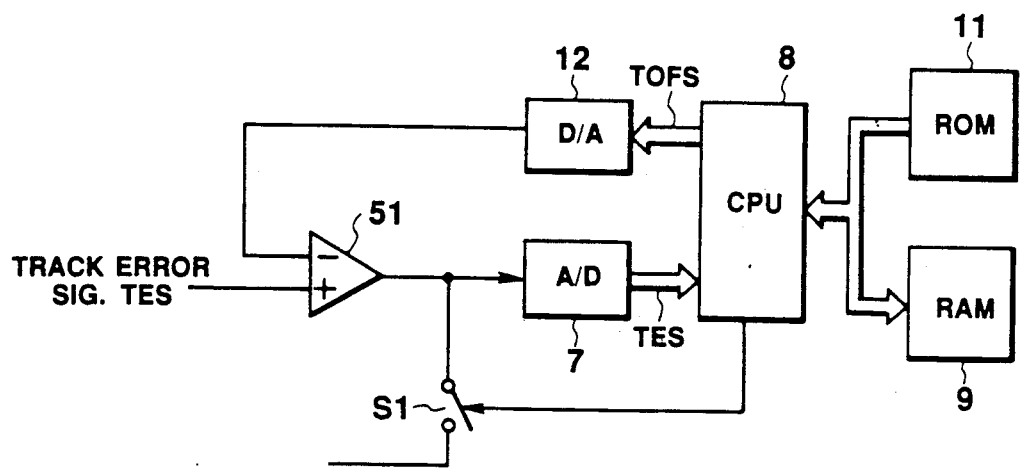
FIG. 6 is an illustration of an example of an offset variable means.

This, however, is only illustrative and the offset control may be conducted even with an amplifier which does not have an offset control terminal. For instance, the offset control may be conducted with a differential amplifier 51 shown in FIG. 6.

In this case, the tracking error signal TES from the tracking error signal generating circuit 33a is delivered to the positive terminal of the differential amplifier 51, while the output of the D/A converter 12 is supplied to the negative terminal of the same. The output from the differential amplifier 41, i.e., a signal obtained by removing the offset component from the tracking error signal TES, is delivered to the CPU 8 through the A/D converter 7. In the circuit shown in FIG. 6, the level of the output from the D/A converter 12 is set in accordance with the characteristic of the differential amplifier 41. In addition, the circuit is capable of holding the value of the output of the D/A converter 12. It is therefore not necessary to provide an offset control section 14 in this circuit.

In the first embodiment as described, the upper and lower limit values of the allowable range of offset are fixed and written in the ROM 11. The arrangement, however, may be such that the upper and lower limit values are variable, as in a second embodiment which will be described hereinunder.

Figure 7:
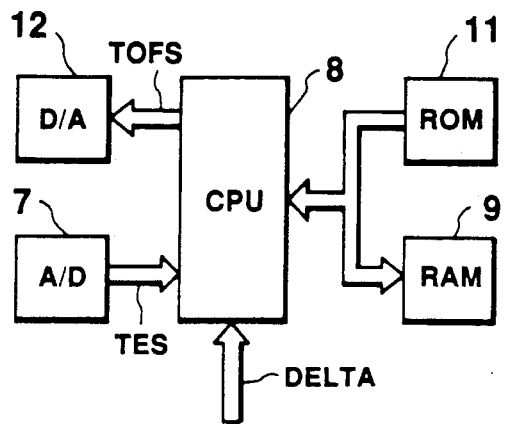
FIG. 7 is a block diagram of a critical portion of a second embodiment of the present invention.

Referring to FIG. 7, the CPU 8 is adapted to receive, in addition to the tracking error signal TES, data DELTA which corresponds to the tolerance of offset from the midst value which is used as the reference or standard. A process shown in FIG. 8 is conducted with this data DELTA.

Figure 8:
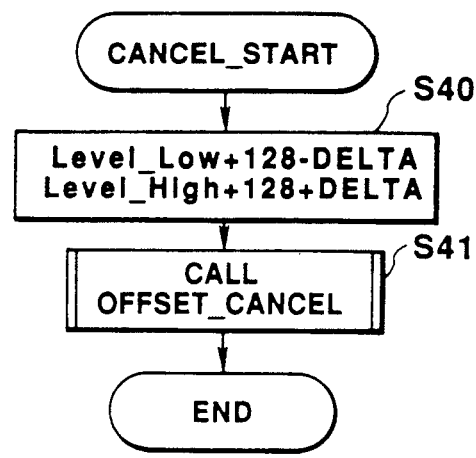
FIG. 8 is a flow chart of a process conducted in the critical portion of the second embodiment shown in FIG. 7.

Referring to FIG. 8, in a step S 40, the CPU 8 reads the data DELTA and determines the lower limit value Level-Low and the upper limit value Level-High of the allowable range, before conducting the offset control. Then, in a step S 41, the CPU executes the offset canceling operation in the same manner as that explained before in connection with the first embodiment with reference to FIG. 4a.

The arrangement may be such that the data DELTA is set through a switch and entered only when the power of the apparatus is turned on. It is also possible to prepare different contents of the data DELTA for different types of discs e.g., laser discs, compact discs, optical discs, opto-magnetic discs and so forth, as well as for disks of different manufacturers and for different reflectivity levels, and the data DELTA peculiar to each disc is entered when the disc is loaded on the apparatus.

In this second embodiment, therefore, an optimum offset correction or control can be conducted in accordance with the characteristic of the servo system and the demand by the user, by virtue of the fact that the allowable range of offset is variable.

Other portions of the second embodiment that those described above are materially the same as those in the first embodiment.

Figure 9:
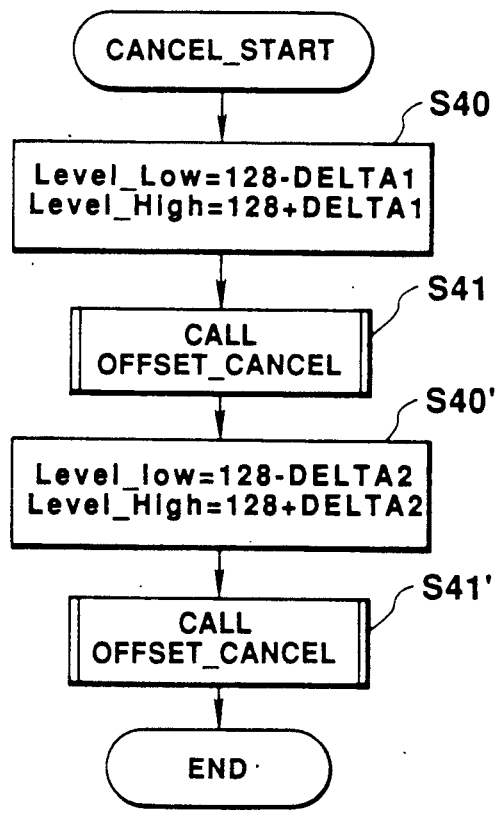
FIG. 9 is a flow chart showing a process different from that shown in FIG. 8.

The flows shown in FIGS. 7 and 8 may be carried out such that the flow of FIG. 8 is conducted with a comparatively large value of the data DELTA at first, and is conducted repeatedly with smaller values of the data DELTA, whereby the offset correction or cancellation is conducted is shown in FIG. 9, in which a condition DELTA 1>DELTA2 is met and the step S 41' executes the same operation as the step S 41 shown in FIG. 8.

Figure 10:
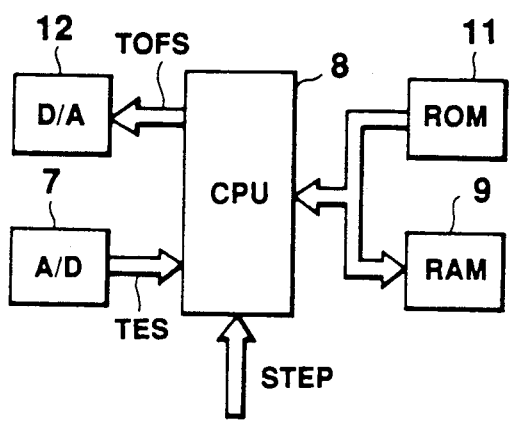
FIG. 10 is a block diagram of a critical portion of a third embodiment of the present invention.

FIG. 10 shows an embodiment in which the width or height of the step of change in the offset level during the offset control can be varied.

In this embodiment, the CPU 8 receives, besides the tracking error signal TES, a data STEP corresponding to the height value of the step of increment or decrement of the set value of the D/A converter 12.

Figure 11:
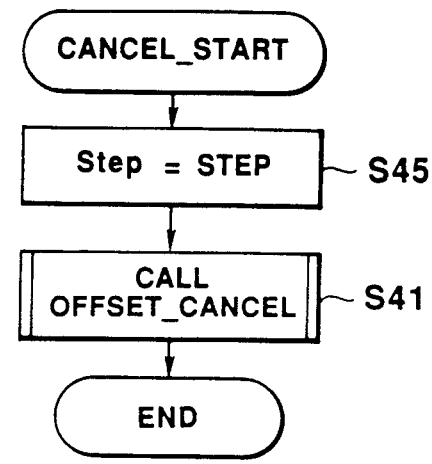
FIG. 11 is a flow chart of a process conducted in the critical portion of the third embodiment shown in FIG. 10.

FIG. 11 shows the flow of this process. As the offset canceling operation is started, the CPU 8 reads the data STEP representing the height of the step of increment or decrement of the set value of the D/A converter 12 in a step S 45. Then, using this data STEP as the increment or decrement step, the CPU commences the offset canceling operation shown in FIG. 4a. Other portions of construction and operation of this embodiment are the same as those of the first embodiment.

The process shown in FIG. 11 also may be modified that the offset canceling step S 41 is executed repeatedly while changing the set value of the step width.

In each of the embodiments described hereinbefore, it is preferred that the step width or height is set to be smaller than the difference between the upper limit value and the lower limit value of the allowable range, i.e., (Level-High—Level-Low), in the case where the amount of shift of the offset level (central level) is equal to the width or height of the increment or decrement step.

Figure 12:
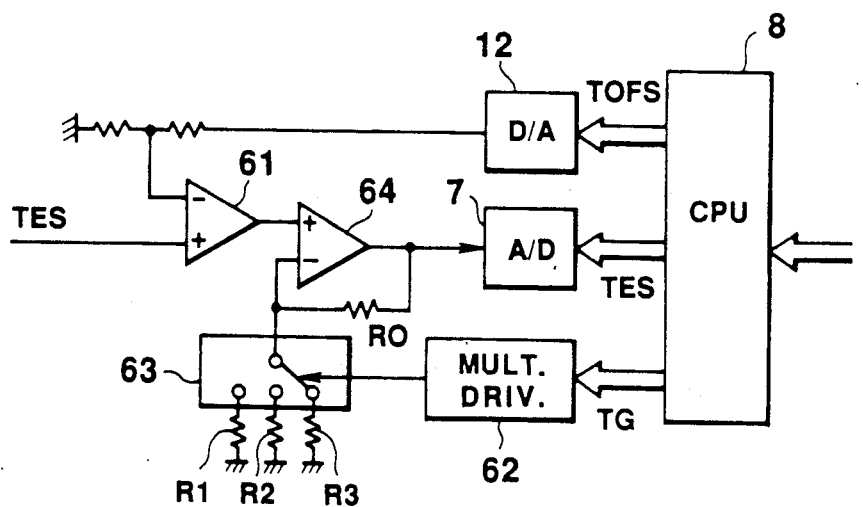
FIG. 12 is a block diagram of a critical portion of a fourth embodiment of the present invention.

FIG. 12 shows the construction of a tracking offset control system in a fourth embodiment of the present invention.

This control system is characterized in that it conducts a tracking gain control in addition to the tracking offset correction.

More specifically, in this embodiment, the CPU 8 delivers an offset correction signal TOFS to the offset control differential amplifier 61 through the D/A converter 12 and, in addition, delivers a gain control signal TG to a multiplexer 63 through a multiplexer drive circuit 62. The inversion input terminal of the differential amplifier 64 and resistors R1, R2 and R3 are selectively turned on in accordance with the output of the driving circuit 62, so as to enable the gain to be set in a variable manner. Although only three resistors $R_1, R_2$ and $R_3$ are shown, it is to be understood that the greater the number of the resistors, the better the results. It is also possible to arrange such that the resistance value of the resistor R0 determining the gain, in addition to the selection of one of the resistors $R_1, R_2$ and $R_3$.

Figure 13A:
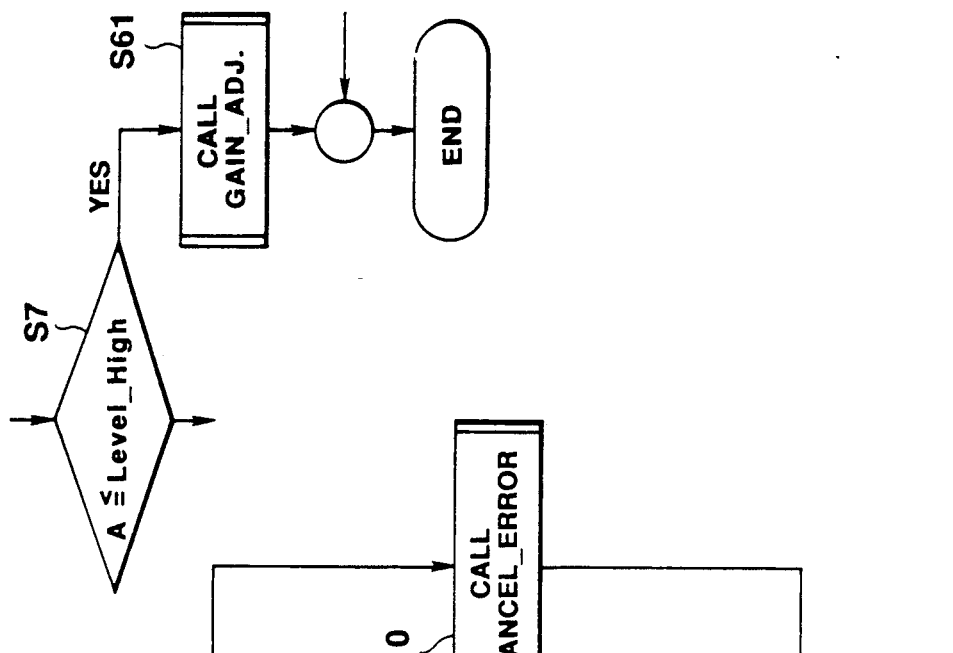
FIGS. 13a and 13b are flow charts showing a process conducted in the critical portion of the fourth embodiment shown in FIG. 12.
Figure 13B:
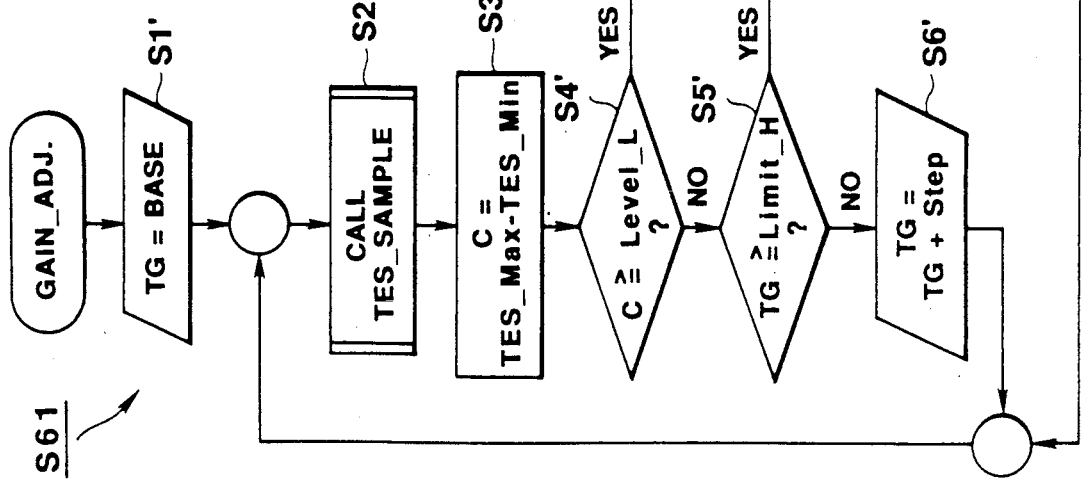

FIGS. 13a to 13c show a main portion of the process for the tracking offset control including the tracking gain control described above.

FIG. 13a shows that the sub-routine S 61, which calls for the gain control flow shown in FIG. 13b, is executed only when the answer to a query posed in the step S 7 of FIG. 4a is YES.

In the flow shown in FIG. 13b, the initial value of the gain is set to the central gain value (indicated by Base).

Then, the flow shown in FIG. 4c is executed. Subsequently, the maximum and minimum values of the tracking error signal are determined and the amplitude C of the tracking error signal is calculated from these maximum and minimum values. In the next step 4', whether the value C is not smaller than the lower limit value Level-L of the allowable range of amplitude is determined. When the answer is YES, the process proceeds to a step S 7' in which whether the above-mentioned value C is not greater than the upper limit value Level-H is determined. The gain control process is ceased when the answer to the query posed in the step S 7' is YES.

If NO is the answer to the query posed in the step S 4', the process proceeds to the next step S 5' in which a judgment is conducted as to whether the gain set value TG is not smaller than the upper limit value Limit-H of the variable range of the gain. If the answer is NO, the process proceeds to a step S 6' in which the set value TG of the gain is incremented by one step. The process then returns to a step S 2. As the set value G of the gain is incremented in this manner, the amplitude value C finally becomes not smaller than the allowable lower limit value Level-L in most cases. The process then proceeds to a step S 7' in which a judgment is conducted as to whether the set value TG of the gain is not greater than the lower limit value of the variable range. When the answer is NO, the process proceeds to the next step S 9' in which the gain set value TG is decremented by one step. The process then returns to the step S 2.

According to this embodiment, the offset and the gain of the servo loop of the tracking servo system are controlled to set the offset and the gain to allowable levels, whereby a tracking servo system operable with a high accuracy can be obtained.

Although the present invention has been described through specific preferred embodiments, it is to be understood that parts of these embodiments may be suitably combined to provide various forms of embodiment and such embodiment falls within the scope of the present invention.

What is claimed is:
1. A tracking servo system comprising:
  beam generating means for generating a light beam for recording or reproduction of information in and from an optical recording medium having information recording tracks;
  an objective lens for applying said light beam to said optical recording medium;
  lens actuator means for driving said objective lens in a direction to cross said tracks in response to an input signal;
  a photosensing means for receiving the light beam reflected from said optical recording medium;
  tracking error signal generating means for generating, from the output of said photosensing means, a tracking error signal indicative of the offset of a beam spot formed by said light beam on said optical recording medium from an object track;
  variable level means for changing an output level of said tracking error signal by shifting the level of said tracking error signal and for outputting an adjusted tracking error signal;
  drive signal generating means for generating a drive signal which causes said lens actuator means to drive said objective lens in a direction to cross said track; said drive signal generating means being connected to supply said drive signal to said lens actuator means;

switching means having an ON condition and an OFF condition for connecting the output from said variable level means to said lens actuator means when said switching means is in said ON condition, so as to operate as a tracking servo to cause said beam spot to trace an object track; said switching means being connected such that, in said OFF condition, said output from said variable level means is disconnected from said lens actuator means;

control means for receiving the output of said tracking error signal generating means, for determining an offset adjustment amount and producing an offset adjustment signal representing said offset adjustment amount, and for generating a drive signal to said lens actuator means so as to selectively cause said lens actuation means to drive said objective lens in a direction to cross a track, said control means including:

(a) mean value detection means which, when said switching means is in said OFF condition, receives said tracking error signal and detects a mean value of said tracking error signal;

(b) standard range output means for outputting a standard range which is used as a reference for determination as to whether an offset exists in said tracking error signal; and (c) offset control means for controlling an amount of a level shift which is to be effected by said variable level means, said offset control means supplying said offset adjustment signal to said variable level means so as to cause said mean value to fall within said standard range.

2. A tracking servo system according to claim 1, wherein said mean value detection means detects the maximum and minimum values of said tracking error signals and determines said mean value as the mean of said maximum and minimum values.

3. A tracking servo system according to one of claims 1 and 2, wherein said drive signal generating means supplies said lens actuator means with said drive signal of a level which provides a higher track crossing speed than the track crossing speed which is caused by eccentricity of at least one of said optical recording medium and a spindle motor which rotatingly drives said optical recording medium.

4. A tracking servo system according to one of claims 1 and 2, wherein said mean value detection means and said offset control means are constituted by a CPU.

5. A tracking servo system according to claim 2, wherein said mean value detection means has storing means for updatably storing said maximum value and said minimum value, a first comparing means for comparing whether the level of a tracking error signal inputted after said maximum value stored in said storing means is greater than said maximum value, a second comparing means for comparing whether the level of a tracking error signal inputted after said minimum value stored in said storing means is smaller than said minimum value and an updating controlling means for updating said maximum value or said minimum values stored in said storing means as a result of said first or second comprising means making a determination that the level of a tracking error signal is greater than said maximum value or smaller than said minimum value.

6. A tracking servo system according to one of claims 1 and 2, wherein said standard range output means includes a ROM.

7. A tracking servo system according to one or claims 1 and 2, wherein the standard range to be output from said standard range output means is variable.

8. A tracking servo system according to one of claims 1 and 2, wherein said standard range output means outputs the upper and lower limit values of said standard range.

9. A tracking servo system according to one of claims 1 and 2, wherein said offset control means, while the amount of the level shift performed by said variable level means is controlled to cause said mean value to be between the upper and lower limit values of said standard range, further controls the amount of level shift by said variable level means after changing said upper and lower limit values of said standard range.

10. A tracking servo system according to one of claims 1 and 2, wherein said offset control means controls the amount of the level shift conducted by said variable level means by incrementing or decrementing the level of the signal to be output by a small value.

11. A tracking servo system according to one of claims 1 and 2, wherein said variable level means includes a variable gain means which can variably set the gain of said tracking error signal so as to enable the tracking loop gain to be controlled under the tracking servo condition.

12. A tracking servo system according to claim 11, further comprising amplitude detection means for detecting the amplitude of the tracking error signal derived from said variable gain means.

13. A tracking servo system according to claim 12, wherein said mean value detection means has storing means for updatably storing said maximum value and said minimum value, a first comparing means for comparing whether the level of a tracking error signal inputted after said maximum value stored in said storing means is greater than said maximum value, a second comparing means for comparing whether the level of a tracking error signal inputted after said minimum value stored in said storing means is smaller than said minimum value and an updating controlling means for updating said maximum value or said minimum values stored in said storing means as a result of said first or second comparing means making a determination that the level of a tracking error signal is greater than said maximum value or smaller than said minimum value.

14. A tracking servo system according to claim 13, wherein said offset control means includes an amplitude control means for controlling the amplitude of the output signal from said variable level means.

15. A tracking servo system according to claim 14, wherein said amplitude control means sequentially outputs a plurality of gain control signals for increasing or decreasing the gain of said variable gain means to said variable gain means, said amplitude control means further comprising a comparing means for comparing whether each output signal of said variable gain means in a condition that each gain control signal is applied thereto falls within a reference amplitude value, and a holding means for holding said gain control signal corresponding to the output signal as a result of said comparing means making a determination that said output signal falls within the reference amplitude value.

16. A tracking servo system according to one of claims 1 and 2, wherein said mean value detecting means becomes operative soon after the start up of rotational driving of said optical recording medium.

* * * * *